United States Patent
Febvre et al.

(10) Patent No.: US 8,078,934 B2
(45) Date of Patent: Dec. 13, 2011

(54) COMMUNICATION METHOD AND APPARATUS

(75) Inventors: Paul R. Febvre, Ipswich (GB); Panagiotis Fines, London (GB)

(73) Assignee: Inmarsat Limited, London (GB)

( * ) Notice: Subject to any disclaimer, the term of this patent is extended or adjusted under 35 U.S.C. 154(b) by 1259 days.

(21) Appl. No.: 11/743,438

(22) Filed: May 2, 2007

(65) Prior Publication Data

US 2008/0134009 A1 Jun. 5, 2008

Related U.S. Application Data

(62) Division of application No. 10/470,417, filed as application No. PCT/GB02/00431 on Jan. 30, 2002, now Pat. No. 7,231,583.

(30) Foreign Application Priority Data

Jan. 31, 2001 (GB) .................................. 0102448.8

(51) Int. Cl.
*H03M 13/00* (2006.01)

(52) U.S. Cl. ......... 714/755; 714/786; 714/701; 714/790

(58) Field of Classification Search .................. 714/701, 714/790, 755, 786
See application file for complete search history.

(56) References Cited

U.S. PATENT DOCUMENTS

| 4,649,543 A | 3/1987 | Levine |
| 4,729,043 A * | 3/1988 | Worth .......................... 386/264 |
| 6,771,615 B1 | 8/2004 | Park et al. |

FOREIGN PATENT DOCUMENTS

| EP | 946013 | * 9/1999 |
| JP | 4292031 | 10/1992 |
| JP | 11145945 | 5/1999 |
| JP | 2000236315 | 8/2000 |

* cited by examiner

*Primary Examiner* — Guy Lamarre
(74) *Attorney, Agent, or Firm* — Sterne, Kessler, Goldstein & Fox P.L.L.C.

(57) ABSTRACT

In a frame sync method, a receiver searches for the presence of an N-symbol long unique word pattern. For each possible frame sync detected, the receiver proceeds to demodulation and FEC processing. After each iteration of the FEC decoder, the detected unique word pattern is compared to the expected one and the frame sync is detected if the number of unique word errors has decreased.

8 Claims, 6 Drawing Sheets

Fig. 5

| d0 | p0 | q0 |
|---|---|---|
| d1 | p1 | q1 |
| d2 | p2 | q2 |
| d3 | p3 | q3 |
| d4 | p4 | q4 |
| d5 | p5 | q5 |
| d6 | p6 | q6 |
| d7 | p7 | q7 |
| d8 | p8 | q8 |
| d9 | p9 | q9 |
| d10 | p10 | q10 |
| d11 | p11 | q11 |
| d12 | p12 | q12 |
| d13 | p13 | q13 |
| d14 | p14 | q14 |
| d15 | p15 | q15 |
| d16 | p16 | q16 |
| d17 | p17 | q17 |
| d18 | p18 | q18 |
| d19 | p19 | q19 |
| d20 | p20 | q20 |
| d21 | p21 | q21 |
| d22 | p22 | q22 |
| d23 | p23 | q23 |
| d24 | p24 | q24 |
| d25 | p25 | q25 |
| d26 | p26 | q26 |
| d27 | p27 | q27 |
| d28 | p28 | q28 |
| d29 | p29 | q29 |
| d30 | p30 | q30 |
| d31 | p31 | q31 |
| d32 | p32 | q32 |
| d33 | p33 | q33 |
| d34 | p34 | q34 |
| d35 | p35 | q35 |
| d36 | p36 | q36 |
| d37 | p37 | q37 |
| d38 | p38 | q38 |
| d39 | p39 | q39 |
| d40 | p40 | q40 |
| d41 | p41 | q41 |
| d42 | p42 | q42 |
| d43 | p43 | q43 |
| d44 | p44 | q44 |
| d45 | p45 | q45 |
| d46 | p46 | q46 |
| d47 | p47 | q47 |
| d48 | p48 | q48 |
| d49 | p49 | q49 |
| d50 | p50 | q50 |
| d51 | p51 | q51 |
| d52 | p52 | q52 |
| d53 | p53 | q53 |
| d54 | p54 | q54 |
| d55 | p55 | q55 |
| d56 | p56 | q56 |
| d57 | p57 | q57 |
| d58 | p58 | q58 |
| d59 | p59 | q59 |
| d60 | p60 | q60 |
| d61 | p61 | q61 |
| d62 | p62 | q62 |
| d63 | p63 | q63 |

Fig. 6

| d0 | p0 | q0 |
|---|---|---|
| d1 | p1 | q1 |
| d2 | p2 | q2 |
| d3 | p3 | q3 |
| d4 | p4 | q4 |
| d5 | p5 | q5 |
| d6 | p6 | q6 |
| d7 | p7 | q7 |
| d8 | p8 | q8 |
| d9 | p9 | q9 |
| d10 | p10 | q10 |
| d11 | p11 | q11 |
| d12 | p12 | q12 |
| d13 | p13 | q13 |
| d14 | p14 | q14 |
| d15 | p15 | q15 |
| d16 | p16 | q16 |
| d17 | p17 | q17 |
| d18 | p18 | q18 |
| d19 | p19 | q19 |
| d20 | p20 | q20 |
| d21 | p21 | q21 |
| d22 | p22 | q22 |
| d23 | p23 | q23 |
| d24 | p24 | q24 |
| d25 | p25 | q25 |
| d26 | p26 | q26 |
| d27 | p27 | q27 |
| d28 | p28 | q28 |
| d29 | p29 | q29 |
| d30 | p30 | q30 |
| d31 | p31 | q31 |
| d32 | p32 | q32 |
| d33 | p33 | q33 |
| d34 | p34 | q34 |
| d35 | p35 | q35 |
| d36 | p36 | q36 |
| d37 | p37 | q37 |
| d38 | p38 | q38 |
| d39 | p39 | q39 |
| d40 | p40 | q40 |
| d41 | p41 | q41 |
| d42 | p42 | q42 |
| d43 | p43 | q43 |
| d44 | p44 | q44 |
| d45 | p45 | q45 |
| d46 | p46 | q46 |
| d47 | p47 | q47 |
| d48 | p48 | q48 |
| d49 | p49 | q49 |
| d50 | p50 | q50 |
| d51 | p51 | q51 |
| d52 | p52 | q52 |
| d53 | p53 | q53 |
| d54 | p54 | q54 |
| d55 | p55 | q55 |
| d56 | p56 | q56 |
| d57 | p57 | q57 |
| d58 | p58 | q58 |
| d59 | p59 | q59 |
| d60 | p60 | q60 |
| d61 | p61 | q61 |
| d62 | p62 | q62 |
| d63 | p63 | q63 |

Fig. 7

| Type | Start | | | | | | | | End | | | | | |
|---|---|---|---|---|---|---|---|---|---|---|---|---|---|---|
| L8 | E | 4 | 5 | 6 | 4 | A | D | A | B | D | 5 | 2 | E | A | 4 | 0 |
| L7 | B | E | D | 8 | B | 3 | E | A | D | 2 | 9 | 4 | 9 | 6 | 7 | 2 |
| L6 | F | 2 | F | 5 | F | 4 | 9 | 6 | A | 6 | A | 3 | 7 | 5 | 4 | C |
| L5 | C | 9 | 1 | 1 | 3 | 6 | 4 | 2 | 8 | A | B | 1 | D | 4 | 5 | 9 |
| L4 | F | 9 | A | 4 | 2 | B | B | 1 | A | B | 5 | B | B | A | C | B |
| L3 | D | 4 | E | 3 | 5 | 7 | 2 | 9 | 9 | C | B | 8 | 8 | 4 | D | 2 |
| L2 | 4 | C | B | 9 | D | 9 | D | 1 | 7 | 4 | D | 7 | 4 | 2 | A | F |
| L1 | 6 | A | A | F | 7 | A | 6 | E | 4 | E | C | C | B | 3 | 3 | 1 |
| R | A | E | 7 | E | 4 | B | B | 5 | C | D | 4 | 5 | F | 8 | A | 7 |
| H1 | 5 | 1 | 4 | B | B | 8 | B | A | 6 | 2 | D | E | 1 | 2 | 2 | 4 |
| H2 | B | 5 | 8 | 9 | 6 | C | C | D | D | F | 6 | C | 5 | 9 | F | 5 |
| H3 | A | 8 | 7 | B | 0 | D | A | 6 | C | 9 | 6 | 5 | 0 | 9 | 7 | E |
| H4 | 5 | A | 1 | A | 6 | 7 | 9 | D | 6 | F | 2 | 6 | D | D | A | 3 |
| H5 | 6 | 1 | F | E | A | 5 | 4 | 9 | 4 | 3 | 3 | 4 | 7 | C | B | 6 |
| H6 | A | 3 | 2 | A | D | 2 | 8 | 1 | C | 4 | 9 | D | C | 6 | F | 9 |
| H7 | 7 | 7 | 5 | D | 1 | B | 0 | 5 | 5 | 8 | C | 5 | E | 3 | B | A |
| H8 | D | F | B | 2 | 8 | 8 | 0 | E | 9 | 1 | 4 | 0 | 4 | B | 5 | 5 |

COMMUNICATION METHOD AND APPARATUS

CROSS REFERENCE TO RELATED APPLICATIONS

This application is a Division of U.S. application Ser. No. 10/470,417, filed on Jan. 5, 2004 now U.S. Pat. No. 7,231,583 by FEBVRE, Paul et al., entitled COMMUNICATION METHOD AND APPARATUS, the entire contents of which is incorporated by reference, and for which priority is claimed under U.S.C. §120, which is a National Stage entry of co-pending International Patent Application No. PCT/GB02/00431, filed on Jan. 30, 2002 by FEBVRE, Paul et al., entitled COMMUNICATION METHOD AND APPARATUS, the entire contents of which is incorporated by reference, and for which priority is claimed under 35 U.S.C. §371. As in the parent application Ser. No. 10/470,417, priority is also claimed to co-pending Great Britain Application No. 0102448.8, filed on Jan. 31, 2001, the entire contents of which is also incorporated by reference, and for which priority is claimed under U.S.C. §119.

BACKGROUND OF THE INVENTION

The present invention relates to a method, apparatus, program and/or signal for data communication over a channel that is susceptible to interference. Particularly, but not exclusively, the present invention relates to a frame synchronisation technique using forward error correction (FEC).

1. Field of the Invention

FEC techniques have been developed which allow a very low signal energy-to-noise ratio ($E_s/N_o$). One example is 'Turbo' coding as described in 'Near Shannon Limit error-correcting coding and decoding: Turbo codes' by C. Berrou, A. Glavieux and P. Thitimajshima, Proc. IEEE ICC, Geneva, May 1993. However, these FEC techniques require the start and end boundaries of the data transmission to be defined precisely by the receiver before the FEC decoding process starts. The detection of the transmission boundaries is known as frame synchronisation or frame sync.

2. Background Art

Frame sync is one of the first operations in the demodulation process; usually, the demodulation process is followed by the FEC process, so that there is a time separation between the frame sync and the FEC process. Within this time separation, frame sync needs to be established successfully with the minimum $E_s/N_o$ required by the FEC process. Known frame sync techniques, as described for example in 'Optimum Frame Synchronization', by J. L. Massey, IEEE Trans. Commun., vol. 20, no. 2, Apr. 1972 and 'Frame Synchronization Techniques', by R. Scholtz, IEEE Trans. Commun., vol. 28, no. 8, Aug. 1980, achieve frame sync at a low $E_s/N_o$ by means of lengthy Unique Words (UW), specially designed data patterns which are added to each packet transmission. The unique words occupy bandwidth which could otherwise be used to carry user or signalling data.

The use of lengthy unique words is particularly costly of bandwidth in multi-user environments where channel conditions vary over time and per user, such that each burst transmission requires independent acquisition at the receiver. One such environment is a TDMA scheme where it is desirable to use small burst lengths to minimize latency and for efficient resource management; however, this leads to a high ratio of framing overhead to data within bursts.

It would be desirable to find a frame sync technique which improves the data transmission efficiency without sacrificing frame sync quality.

The paper 'Decoder-assisted Frame Synchronisation for Turbo Coded Systems', by H. Howlader, Y. Wu and B. Woerner, $2^{nd}$ International Symposium on Turbo Codes, Brest, France, September 2000, discloses a decoder-assisted frame sync technique in which a synchronisation word is embedded in a packet of data before encoding. The synchronisation word is preceded by a number of flush bits which are necessary to bring the Turbo decoding trellis to a known state. The synchronisation word then guides the decoding trellis through a sequence of known states, if the correct synchronisation has been detected.

BRIEF SUMMARY OF THE INVENTION

According to one aspect of the present invention, there is provided a method of encoding data for transmission over a channel, in which the data contents of a frame or burst are combined with a unique word and the unique word is input to a systematic convolutional encoder before any of the data. The state of the convolutional encoder is reset before the contents of each burst or frame are encoded. In this way, the unique word is convolutionally encoded independently of the data, without using flush bits. This avoids the overhead associated with transmitting flush bits. This aspect of the invention also extends to a corresponding decoding method and to a signal encoded by the method.

According to another aspect of the present invention, there is provided a method of detecting the synchronisation timing of a received burst or frame, in which a received signal including a forward error corrected unique word is decoded using an iterative technique, and the detected number of errors in the unique word after each iteration is used to determine whether the assumed synchronisation timing is correct.

BRIEF DESCRIPTION OF THE DRAWINGS/FIGURES

Specific embodiments of the present invention will now be described with reference to the accompanying drawings, in which:

FIG. 5 is a table showing the output of a rate ⅓ encoder in a specific embodiment of the present invention;

FIG. 6 is a table showing the output of a rate ½ encoder in a specific embodiment of the present invention; and FIG. 7 is a table of sample unique word and parity bit patterns at the start and end of a frame.

DETAILED DESCRIPTION OF THE INVENTION

In order to explain the advantages of embodiments of the present invention, a prior art frame sync technique will first be described.

In the prior art frame sync technique, the start of a frame of transmitted data is detected by comparing the received bit sequence with a known unique word pattern at the receiver. An N symbol unique word is assumed to be detected if the receiver detects at least n bits equal in value to the unique word pattern within a window of N bits. The criteria for choosing a suitable value of n are the probability that the unique word is present but is not detected and the probability that the unique word is detected but is not actually present, for any random sequence of symbols. The possible events are summarised in Table 1 below:

TABLE 1

(a) Frame Sync Events

| Rx | Tx | |
|---|---|---|
| | UW Sent | UW Not Sent |
| Accept UW | Correct | False detection |
| Reject UW | Missed Detection | Correct |

The probability of missed detection ($P_m$) increases with:
a) Increasing threshold n
b) Increasing symbol error rate (decreasing Es/No); and
c) Increasing length of the unique word.

If a unique word is missed, then the whole packet is lost by the receiver.

The probability of false detection (Pf) increases with:
a) Decreasing threshold n
b) Decreasing the length of the unique word; and
c) Increasing the number of possible unique word patterns.

A false alarm does not necessarily lead to a data packet loss if the receiver has the resources to demodulate and FEC decode the data every time the frame sync modules assumes that the unique word has been detected. However, this leads to an unacceptable level of complexity in the receiver, so in practice a false alarm may lead to loss of the current packet and possibly following packets. This is because a false alarm will certainly lead to an FEC error, but the receiver cannot detect whether the error was caused by false packet boundaries or bad channel conditions, and may attempt to decode again within the pre-assigned time slot for that packet. Thus, if receiver resources are limited, up to a number X of packets may be lost for every false alarm.

In many cases, the unique word indicates not only the frame boundary but other information, such as packet type; in those cases, there is a set of Y possible unique words. The receiver compares the received unique word to all possible unique words in the set and decides frame sync and packet type based on the best match. The probability $P_m$ does not vary with the number Y, but $P_f$ increases linearly.

The probability $P_s$ of packet loss due to frame sync failure is given by the following equation:

$$P_s(N,n,E_s/N_o)=P_m(N,n,E_s/N_o)+X*Y*P_f(N,n) \quad (1)$$

Figure 1:
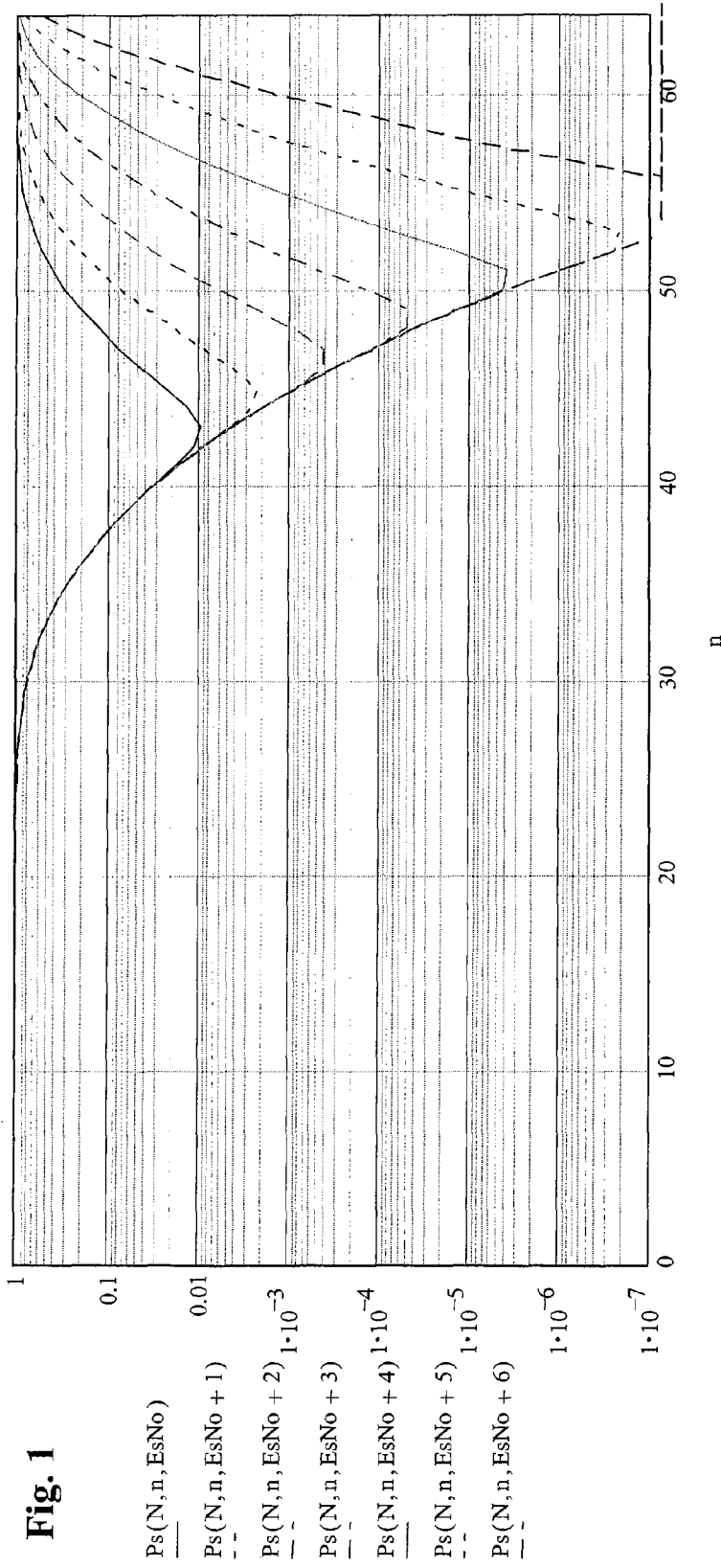
FIG. 1 is a graph showing the probability of packet loss due to frame sync failure as a function of the threshold number of bits required to be equal to unique word bits in order to detect frame sync, in a prior art frame sync technique.

FIG. 1 shows an example of $P_s$ as a function of n with N=64, X=Y=1, over a range of $E_s/N_o$. At the low end of $E_s/N_o$, the global minimum value of $P_s$ is 0.01, due to the added term $P_f$.

The probability $P_p$ of packet error due to false sync and/or FEC decoder error is given by:

$$P_p(N,n,E_s/N_o)=P_s(N,n,E_s/N_o)+P_{fec}(E_s/N_o) \quad (2)$$

where $P_{fec}$ is the packet error probability of the FEC decoder.

Hence, in order to minimize $P_p$ for a given $E_s/N_o$ value, one has to minimize $P_m$, $P_f$ and $P_{fec}$. It is common practice to set $P_{fec}$ at a desired level and then choose $P_m$ and $P_f$ at least an order of magnitude less than $P_{fec}$ to ensure that the overall performance is not degraded due to false sync. Unfortunately, for the reasons stated above, $P_m$ and $P_f$ have contradictory dependencies and can be minimized jointly only by using long unique words—see 'Elements of Digital Satellite Communication', by W. W. Wu, Computer Science Press, 1984. It is mainly for this reason that long unique words are used in practice.

Embodiments of the present invention eliminate the dependence of $P_p$ on $P_f$ by providing a mechanism by which the receiver can detect a false detection. The overall receiver complexity may also be reduced by allowing detection of false alarms well before the FEC process has been fully completed. Hence, $P_s$ is now given by:

$$P_s(N,n,E_s/N_o)=P_m(N,n,E_s/N_o) \quad (3)$$

Figure 2:
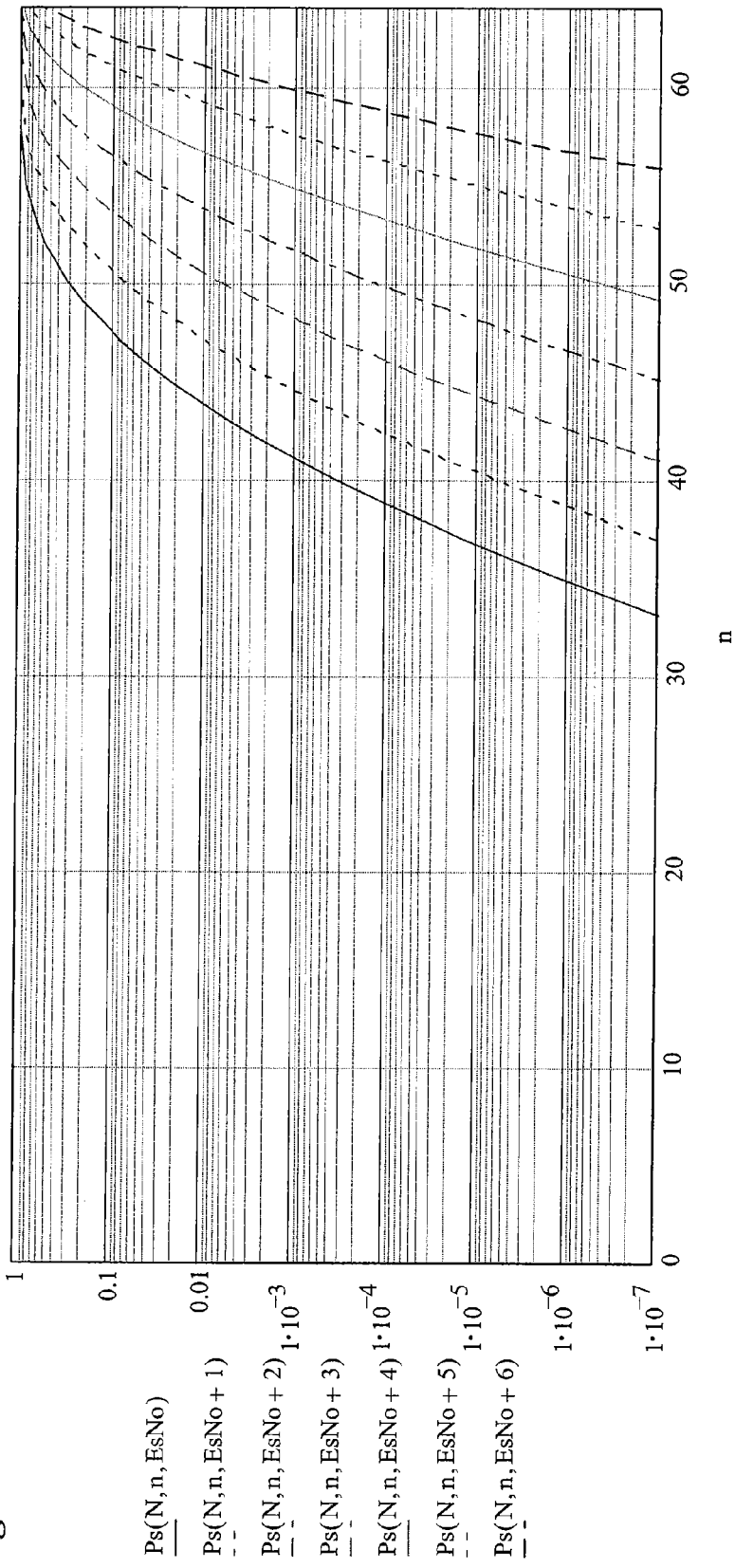
FIG. 2 is a graph showing the probability of packet loss due to frame sync failure as a function of the threshold number of bits required to be equal to unique word bits in order to detect frame sync, in a technique in an embodiment of the present invention.

FIG. 2 shows $P_s$ as a function of n with N=64 using an embodiment. The independence of $P_s$ on $P_f$ has eliminated the minimization floor; for any value of $P_s$ an appropriate value of n can be chosen, even for the lowest values of $E_s/N_o$.

With these embodiments, $P_p$ is given by:

$$P_p(N,n,E_s/N_o)=P_m(N,n,E_s/N_o)+P_{fec}(E_s/N_o) \quad (4)$$

By choosing appropriate values for N and n, one can achieve the requirement $P_m << P_{fec}$ even for small values of N, and hence with short unique words.

In the embodiments, the unique word is treated as part of the data for the purposes of forward error correction. Hence, the unique word detection benefits from the FEC process to remove unique word bit errors, which makes the frame sync decision definitive. In addition, the embodiments allow the use of decoder assisted techniques such as described in 'Improving frame synchronization when using convolutional codes' by P. Robertson, Proc. IEEE GLOBECOM, December 1993; the paper by Howlader, Wu and Woerner referenced above; and 'Frame synchronization of convolutionally encoded sequences for packet transmission', by M. Howlader and B. Woerner, Proc. IEEE ICC, New Orleans, June 2000. These techniques may further reduce the value of $P_m$.

The technique comprises in outline the following steps:
a) The receiver searches for the presence of an N-symbol long unique word pattern and makes decisions based on some threshold n derived from the required $P_m$.
b) Every instant the receiver assumes that the unique word is detected, it proceeds to demodulation and FEC processing. Optionally, decoder-assisted techniques such as referenced above may be used to enhance the reliability of the unique word acquisition.
c) After each iteration of the FEC decoder, the detected unique word pattern is compared to the expected one and the frame sync hypothesis is tested according to two possible cases:
 a. Case 1—If the frame sync assumption is correct, the FEC should improve the reliability of all the data, including the unique word. If the unique word mismatched data is reduced, this is a strong indication that the unique word has been correctly found. In this case, the receiver completes the FEC process and outputs the data.
 b. Case 2—If the frame sync assumption is wrong, the amount of unique word mismatched data should either increase, or not change as the FEC process attempts to correct the wrong data decisions. This indicates that the frame sync failure was caused by a false detection. In this case, the receiver abandons the FEC process and returns to frame sync search mode.

The frame sync hypothesis can be tested in one of two ways:
i) Sequentially, each time a possible frame sync appears in steps a) and b); or
ii) Selecting from a list of possible frame sync hypotheses over a finite interval, sorted according to their strength, where steps a) and b) are replaced by a list of metrics described in the Massey, Scholtz or Howlader, Wu and Woerner papers referenced above.

The sequential test method requires greater computational load but gives a result with minimum delay. The hierarchical list method reduces computational load but incurs delay due to the creation of the list.

Figure 3:
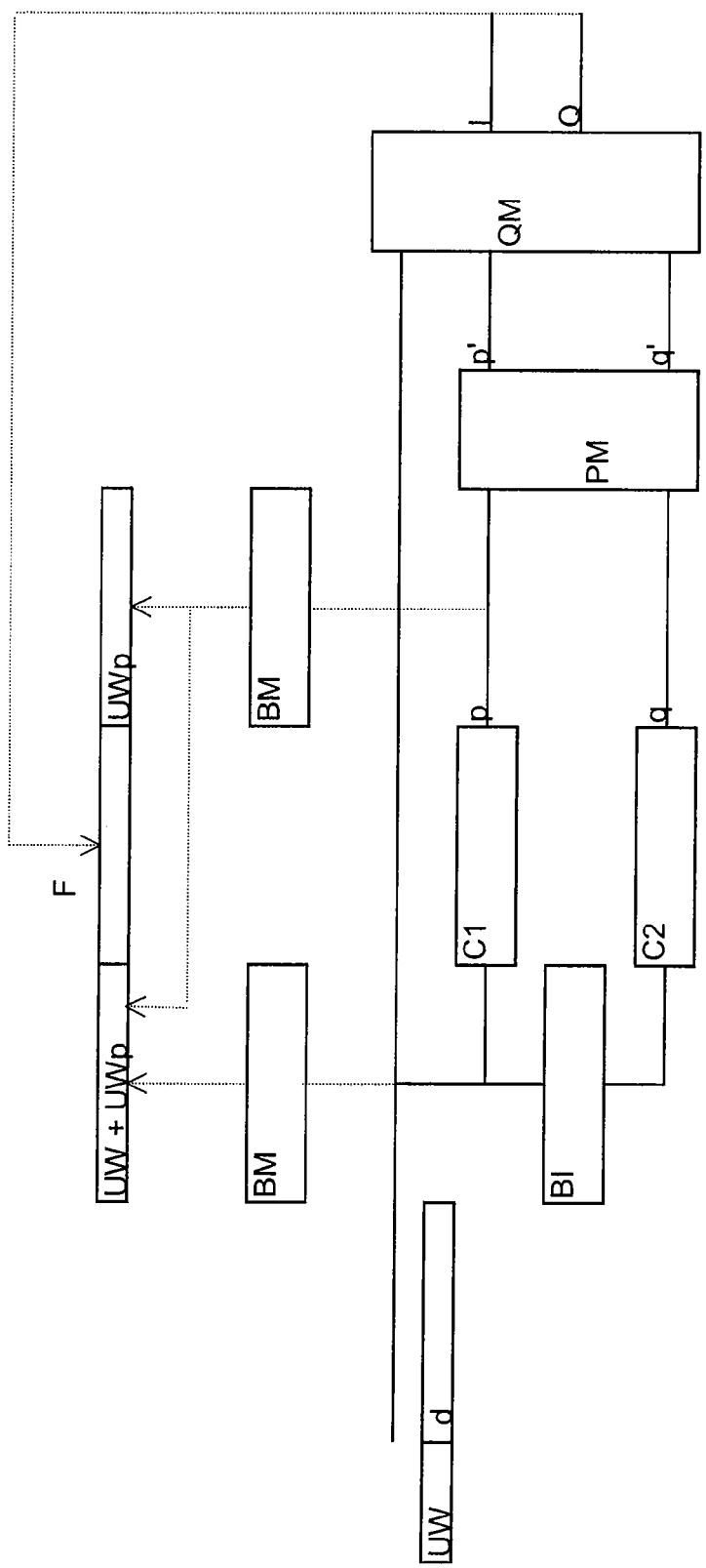
FIG. 3 is a diagram showing the composition of a transmitted frame in an embodiment of the present invention.

A specific embodiment will now be described with reference to FIG. 3. In this example, the FEC technique is Turbo coding with a variable coding rate and the modulation scheme is BPSK for the unique word section and QPSK for the data section. However, other combinations of FEC and modulation may be used. In general, the unique word and data can be carried using any modulation scheme, such as m-ary PSK or m-ary QAM, for example.

The unique word may be selected from a family of unique words, such as Gold or Kasami codes or other pseudo-noise (PN) sequences, according to criteria such as low auto-correlation and cross-correlation, large number of transitions, or minimum d.c. characteristics. Only one unique word may be used, or one of a set of unique words may be selected to convey information in the unique word, such as packet type.

The selected unique word is added to the data d and input before the data d to an FEC encoder comprising a first recursive convolutional encoder C1 and a second recursive convolutional encoder C2 in parallel, with a bit interleaver BI connected before the input to the latter. The first encoder C1 outputs first parity bits p and the second encoder C2 encodes second parity bits q, which are fed to a puncturing mapper PM. The puncturing mapper outputs punctured first and second parity bits p' and q' according to a puncturing scheme which depends on the variable coding rate.

The bit interleaver BI preferably has a capacity sufficient to store the selected unique word and the data bits d, unless a constraint length is applied, as described for example in WO 99/34521. After each frame is encoded, the FEC encoder is reset to an initial state so that the encoding of each frame is independent.

The data bits d and the first and second punctured parity bits p' and q' are input to a QPSK modulator M which outputs channel symbols having I and Q components. The QPSK symbols are transmitted in the middle of the frame F.

The unique word data bits are BPSK modulated by a BPSK modulator BM and the BPSK symbols transmitted as the first 32 symbols of the frame. The first parity bits UWp generated from the unique word data bits are also BPSK modulated and the first 8 BPSK symbols transmitted after the unique word data symbols UW. The remaining 24 BPSK symbols of the unique word first parity bits UWp are transmitted at the end of the frame F.

The unique word data bits UW and the data bits d are interleaved by the bit interleaver BI and input to the second coder C2 to generate the second parity bits q, which are incorporated in the data symbols D in the middle of the frame. However, the symbols may be assembled in the frame F in another order, so long as the order is known at the receiver.

Since a systematic FEC technique is used, the advantageous synchronisation properties of the unique word are preserved in the transmitted signal. Additionally, the incorporation of the unique word bits into the first and second parity bits p and q allows the correction of unique word bits by the receiver, depending on whether correct frame sync has been established.

One specific example is illustrated in FIG. 5, which shows the output bits of a rate ⅓ Turbo coder in the order in which they are input to the puncturing mapper PM. The first 32 of the data bits d and first parity bits p, as highlighted in FIG. 5, are BPSK modulated and inserted at the beginning and end of the frame F as shown in FIG. 3. However, the modulated symbols may occupy other positions within the frame unless a particular order is required in order to reduce the delay of the encoding and modulating stage, as described for example in WO 99/34521.

Another specific example is illustrated in FIG. 6, which shows the output of a rate ½ Turbo coder in the order as output to the puncturing mapper PM, in which the shaded bits are punctured. According to the puncturing map, odd-numbered first parity bits p are punctured except in the range $p_1$-$p_{31}$, which are transmitted so as to give ⅓ coding and therefore better protection to the unique word. This achieves a unique word construction independent of the coding rate.

FIG. 7 shows, in hexadecimal, sample sequences of possible unique word bits UW and first parity bits UWp at the beginning and end of a frame.

Figure 4:
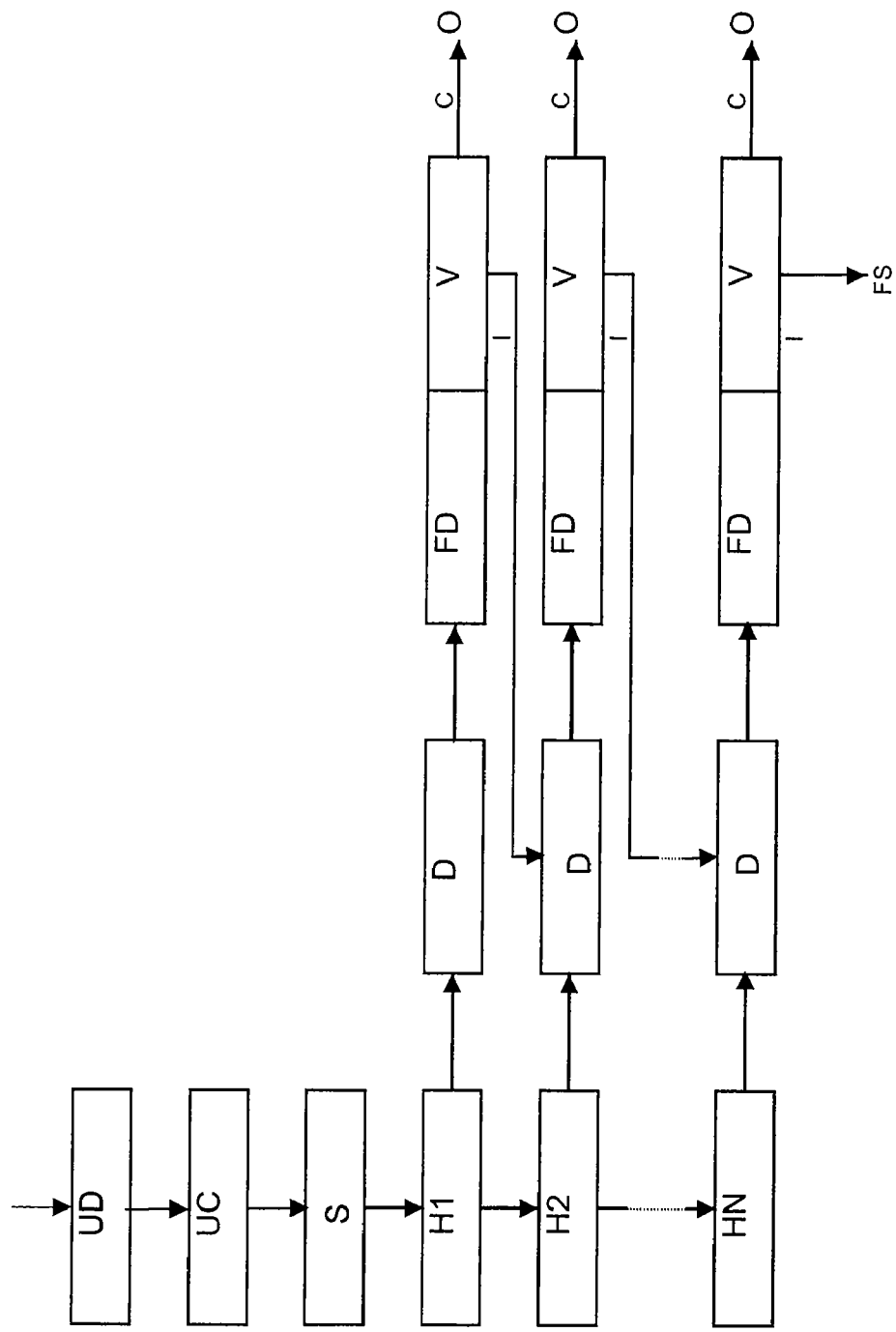
FIG. 4 is a diagram of the demodulation and decoding stages performed by a receiver in an embodiment of the present invention.

FIG. 4 is a schematic diagram of the process steps performed by a receiver in accordance with the present invention. The received signal is demodulated by a unique word demodulator UD, which may be coherent or non-coherent, and is optimised for BPSK demodulation of the unique word signal. The demodulated unique word symbols are processed by a unique word correlator UC which generates a list of possible frame sync positions in time or hypotheses, together with a measure of their relative strengths. The unique word correlator may use additional rules, such as Massey's rule.

Where the unique word is variable to convey signalling information, the unique word correlator correlates the demodulated symbols with each of the possible unique words and generates a strength for each possible unique word.

The possible hypotheses $H_1$ to $H_N$ are sorted by a sorter S according to their strengths. The hypotheses H are processed in order of their hypothesis strength, and for each processed hypothesis the receiver demodulates the received frame using a demodulator D and decodes the demodulated data using an iterative FEC decoder FD corresponding to the FEC coder used to encode the signal. For Turbo decoding, either the MAP or SOVA algorithms may be used by the FEC decoder FD. After each iteration of the FEC decoding algorithm, the number of unique word errors is compared with the number of unique word errors detected before that iteration, by a verification process V. If the hypothesis is correct, as indicated by the arrow C, the number of errors should decrease over one or more iterations. If this is the case, the decoded data is output at an output stage O and the decoding step is complete for the current frame.

If the number of unique word errors increases or stays the same after one or more decoding iterations, the hypothesis is judged incorrect, as indicated by the arrow I, and the hypothesis H of the next highest strength is selected for processing. The hypotheses are processed in order of strength until a correct hypothesis is found, or all of the hypotheses have been processed without finding a correct one. In the latter case, the frame cannot be decoded, and is discarded at a failure stage FS.

FIG. 4 shows multiple demodulating, decoding and verification steps, but this does not necessarily imply that there are multiple demodulators, decoders and verifiers.

While the use of Turbo codes has been described above, other systematic and/or convolutional codes may be used to achieve some or all of the effects of the invention.

Although the encoding and decoding stages are illustrated in terms of discrete processes, either of these stages may be performed by a single processor, such as a DSP. A computer program may be provided for execution on the processor so as to perform the encoding or decoding processes. The computer program may be stored on a suitable physical carrier, such as a disc, or transmitted on a suitable signal carrier.

What is claimed is:

1. A method of generating a frame of forward error corrected data, comprising:
   receiving data;
   convolutionally encoding said data together with a synchronisation pattern, wherein said synchronisation pattern is input before said data is input, so as to generate, in a first encoding step, a first encoded output which is dependent on the synchronisation pattern and independent of the data and, in a second encoding step, a second encoded output which is dependent on said data, wherein said second encoding step includes interleaving said data together with the synchronization pattern;
   convolutionally encoding the output of the interleaving step in parallel with the first encoding step; and
   generating said frame of forward error corrected data from said output of the encoding step and from said synchronisation pattern in unencoded form.

2. A method according to claim 1, wherein the encoding step begins from a predetermined initial state before the data and synchronisation pattern are encoded.

3. A method according to claim 1 or 2, including puncturing some of the second encoded output so that it is not included in said generated frame, while including all of said first encoded output in said generated frame.

4. A method according claim 3, wherein said synchronisation pattern comprises at least one of the bit patterns of the hexadecimal numbers E4564ADA, BED8B3EA, F2F5F496, C9113642, F9A42BB1, D4E35729, 4CB9D9D1, 6AAF7A6E, AE7E4BB5, 514BB8BA, B5896CCD, A87B0DA6, 5A1A679D, 61FEA549, A32AD281, 775D1B05 and DFB2880E.

5. Apparatus for generating a frame of forward error corrected data, comprising:
   a convolutional encoder arranged to encode data together with a synchronisation pattern, wherein the encoder is arranged such that said synchronisation pattern is input to the convolutional encoder before said data is input, so as to generate as output a first encoded output from a first convolutional encoder which is dependent on the synchronisation pattern and independent of the data and a second encoded output from a second convolutional encoder which is dependent on said data;
   a frame generator; and
   a bit interleaver arranged to interleave the data and the synchronization pattern;
   wherein said second convolutional encoder is arranged to encode the data output from the bit interleaver; and
   wherein the frame generator is arranged to generate said frame of forward error corrected data from the output of said first and second encoders and from said synchronization pattern in unencoded form.

6. Apparatus according to claim 5, wherein the encoder is arranged to begin encoding the data and synchronisation pattern from a known state.

7. Apparatus according to claim 5 or 6, wherein said frame generator is arranged to puncture selected portions of the second encoded output so that it is not included in said generated frame, while including all of said first encoded input in said generated frame.

8. Apparatus according to claim 7, wherein said synchronisation pattern comprises at least one of the bit patterns of the hexadecimal numbers E4564ADA, BED8B3EA, F2F5F496, C9113642, F9A42BB1, D4E35729, 4CB9D9D1, 6AAF7A6E, AE7E4BB5, 514BB8BA, B5896CCD, A87B0DA6, 5A1A679D, 61FEA549, A32AD281, 775D1B05 and DFB2880E.

* * * * *